United States Patent [19]

Seguin et al.

[11] 4,073,154
[45] Feb. 14, 1978

[54] APPARATUS AND METHOD FOR CONNECTING AN OFFSHORE PLATFORM RISER TO A PIPELINE

[75] Inventors: Ronald D. Seguin, New Orleans; Douglas D. Raymond, River Ridge, both of La.

[73] Assignee: Texaco Inc., New York, N.Y.

[21] Appl. No.: 729,520

[22] Filed: Oct. 4, 1976

[51] Int. Cl.$^2$ .............................................. F16L 1/00
[52] U.S. Cl. ............................................ 61/86; 61/105; 61/107
[58] Field of Search ................. 61/86, 112, 87, 88; 166/.5, .6; 285/294, 297

[56] References Cited

U.S. PATENT DOCUMENTS

| | | | |
|---|---|---|---|
| 3,219,119 | 11/1965 | Matthews | 166/.5 |
| 3,309,879 | 3/1967 | Miller | 61/112 |
| 3,376,708 | 4/1948 | Hindman | 61/112 X |
| 3,534,984 | 10/1970 | Shuey | 285/297 X |
| 3,670,513 | 6/1972 | Matthews | 61/112 X |
| 3,906,564 | 9/1975 | Thompson et al. | 61/86 |

*Primary Examiner*—Dennis L. Taylor
*Attorney, Agent, or Firm*—Thomas H. Whaley; Carl G. Ries; Robert B. Burns

[57] ABSTRACT

Connection of an offshore platform riser conduit is made to a submerged pipeline by initially providing the riser with an elongated, pivotally connected extension which is operably engaged to the platform. The extension is connected to the pipeline at a point above the water's surface, and then gradually lowered to the ocean floor as additional pipe lengths are added.

3 Claims, 3 Drawing Figures

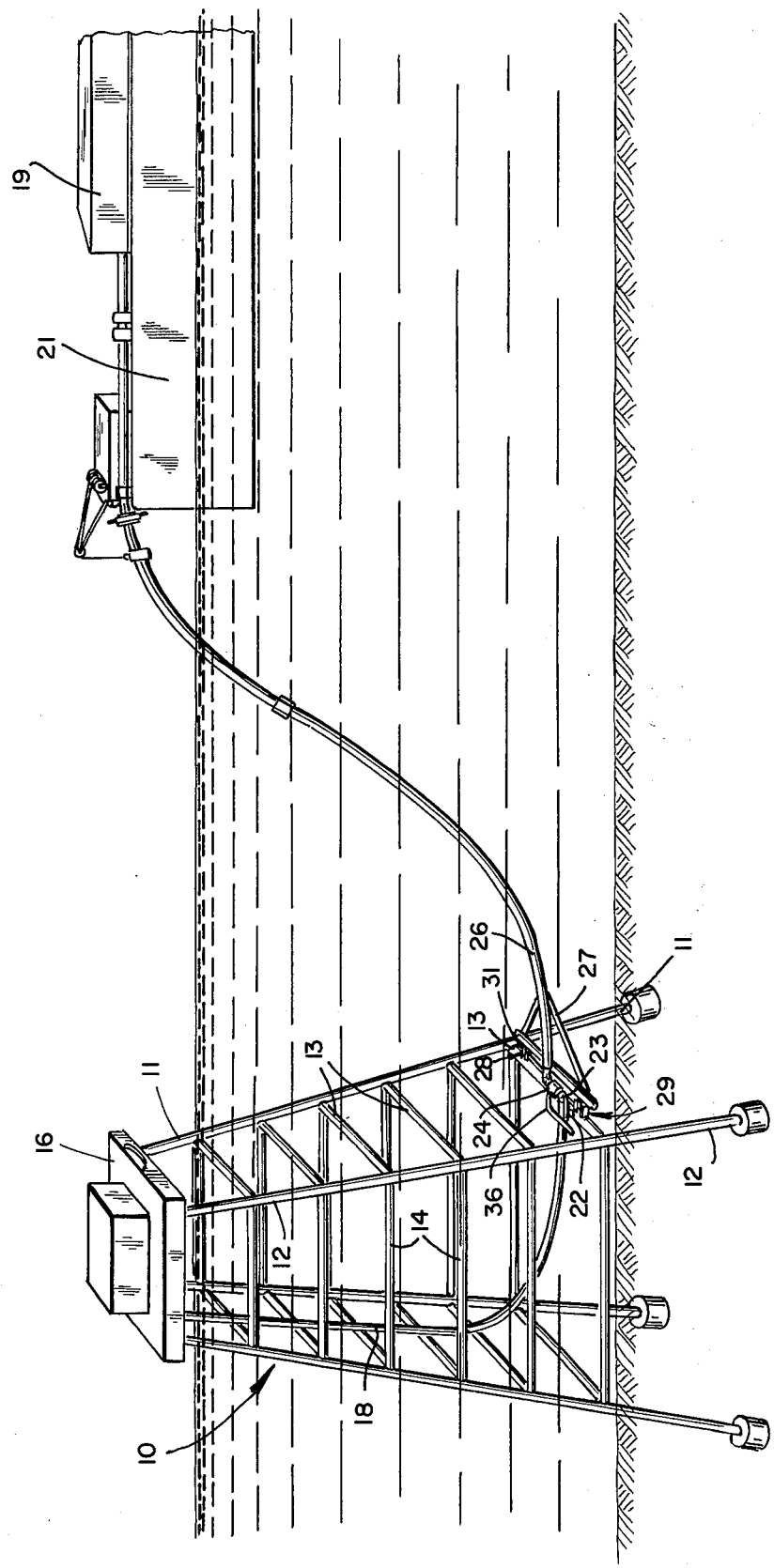

APPARATUS AND METHOD FOR CONNECTING AN OFFSHORE PLATFORM RISER TO A PIPELINE

BACKGROUND OF THE INVENTION

In the offshore segment of the petroleum industry one of the prevalent problems has been the connection of an offshore platform to the pipeline which normally carries petroleum products to an onshore storage area. Usually one or more wells at the bottom of the ocean are connected to a common line which carries the products to a riser or conduit supported by the platform. The riser directs the crude liquid or gas product upwardly to a separation system at the platform's deck prior to the product being conducted away by another such pipeline, or shipped away by tanker.

As a matter of practice, the connection between the pipeline and the riser at the platform, is made by welding the pipe joint to the riser through the use of divers and/or highly technical equipment which is lowered to the sea floor. In the instance of relatively deep waters the normal problem of making the above noted connection is substantially compounded by the hyperbaric atmosphere which limits the use of personnel.

Toward simplifying this laying of the desired pipeline the present invention provides a means whereby the lower end of the fluid carrying riser is pivotally connected at the platform to an extension member. In the resting position the extension member is disposed substantially uprightly so that its open end is at the water's surface. The pipeline segments can then be welded to the extension above water.

As additional segments are added to the pipeline, the extension is lowered to a normal resting position at the ocean floor. After sufficient settling time, the connection to the platform supported riser is solidified in place by the introduction of grout, cement, or other material which can be conducted to the ocean floor through piping, tubing, or the like and caused to solidify when in place.

It is therefore an object of the invention to provide means for connecting a platform supported riser conduit to a pipeline without the necessity of operating underwater or utilizing divers. A further object is to provide an offshore platform including means for connecting a riser member to the pipeline through the use of a pivotally connected riser extension. A still further object is to provide an offshore platform of the type contemplated which simplifies the laying of a pipeline from the water's surface to the floor, after being initially connected to the riser lower end through a pivotally connected joint.

DESCRIPTION OF THE DRAWINGS

FIG. 2 is a segmentary view of a portion of the structure shown in FIG. 1.

Figure 1:
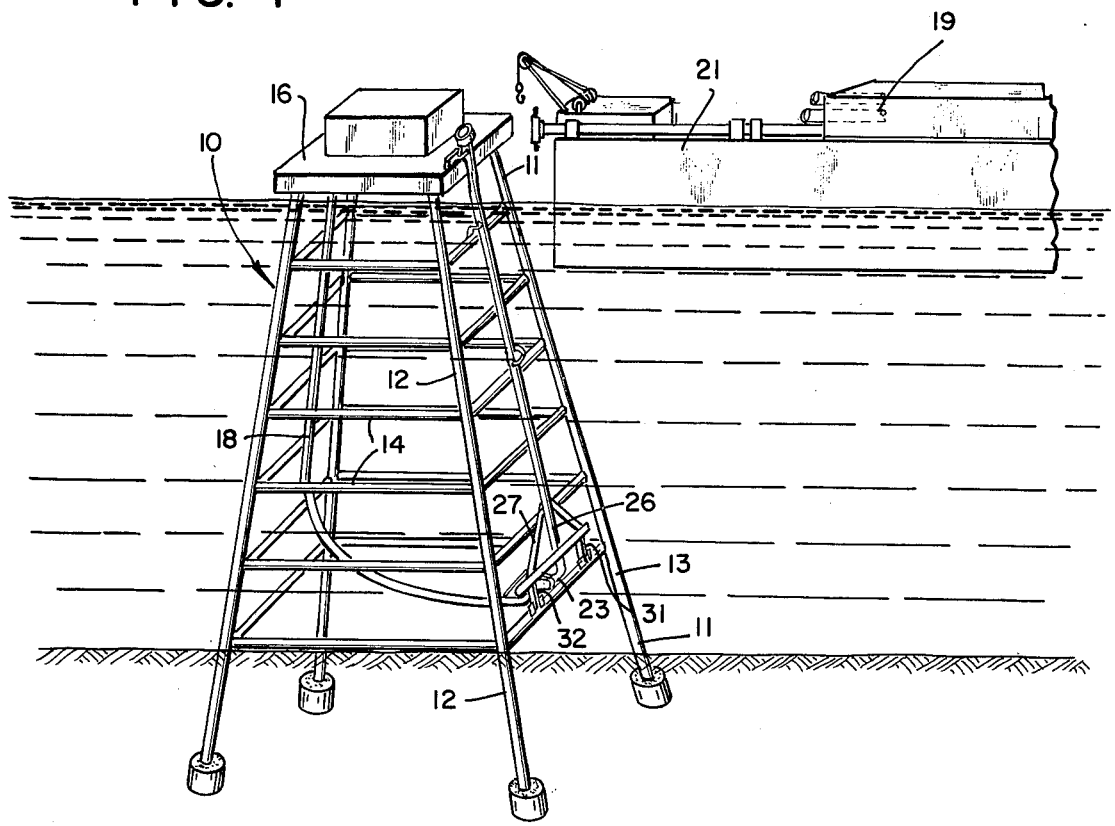
FIG. 1 is an environmental view illustrating the marine structure supported product riser.
Figure 3:
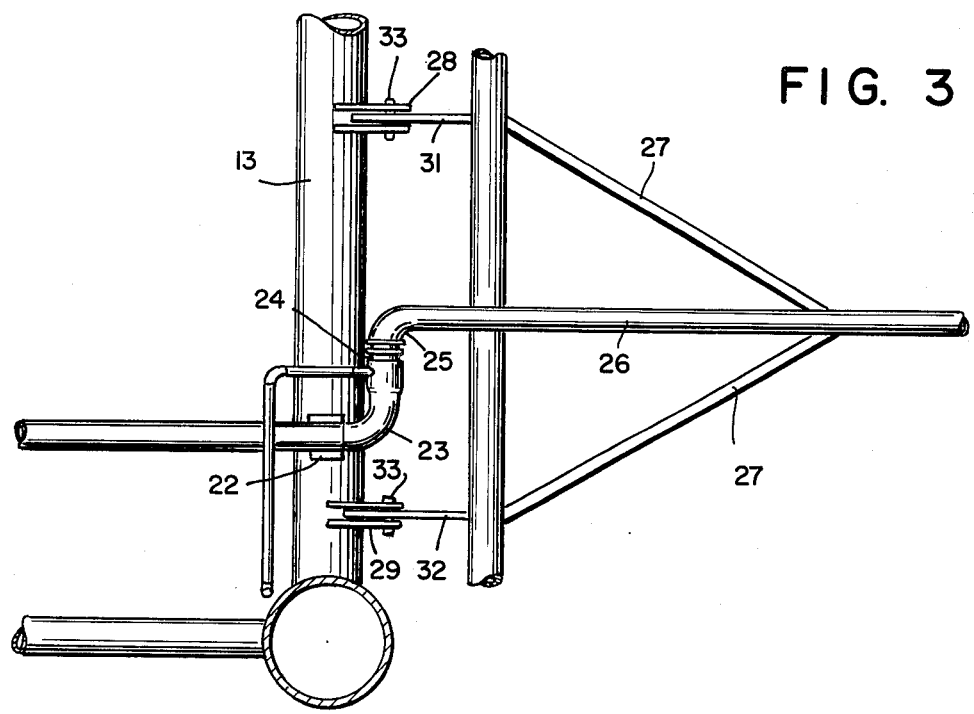
FIG. 3 is a side elevation of the structure shown in FIG. 2.

Referring to the drawings, an offshore plateform 10 of the type contemplated is shown as comprising a plurality of upstanding legs 11 and 12 which include support members 13 and 14 extending therebetween. A working deck 16 is supported at the legs' upper ends. When positioned at an offshore working site platform 10 is arranged substantially vertically such that the respective support legs assume a vertical disposition. After the platform is positioned in place from a carrying barge or the like, piles 17 are driven through the respective legs into the substrate, whereby to fixedly anchor the entire unit and permit operation thereof at the working site.

Toward facilitating the producing process, the crude product is normally led from a series of well heads dispersed at the ocean floor. It is then conducted through a pipeline manifold system, and upward through a riser member 18 which depends from the platform 10. Deck 16 normally carries equipment to initially treat or process the crude product. One such treatment is to separate gas and/or water from the product prior to the latter being further pipelined to shore or loaded onto a cargo vessel or tanker.

As shown in FIG. 2, toward facilitating the connection of the riser member 18 to the pipeline 19, normally carried on a reel or lay barge 21, the riser lower end is anchored with a retaining block 22 or similar means for rigidly positioning said riser end adjacent to the ocean floor. A 90° elbow 23 or like connection, depends from riser 18 lower end, which elbow 23 is adapted to receive a fluid conductive flexible member such as a swivel joint 24, adapted to pivotally move in one place while fastened to elbow 23.

The remote end of said flexible coupling 24 is provided with another 90° elbow 25 and a length of pipe extension 26 preferably formed of the pipeline segments. This pipe extension 26, although shown in a downward position in FIG. 2, is normally fabricated in conjunction with the platform fabrication, and is held in an upstanding postion with its remote end protruding above the water's surface.

Extension member 26 is releasably supported such that it can be pivotally adjusted from its upstanding position to a lowered position where it will rest upon, and be substantially horizontal at the ocean floor. The latter motion is achieved by the cooperative action of the swivel connection at member 24, as well as by the action of swivel joint protection carriage 27, which is pivotally connected to the lower bracing member 13.

Said protection carriage assembly 27 includes a structure positioned to engage the underside of the extension member 26. It includes oppositely arranged hinged pivot points 28 and 29 mounted on a pair of parallel arms 31 and 32. The respective pivot points are operably engaged to the arms by pins 33. The latter, to permit the swiveling support, are disposed in axial alignment one with the other, and also with swivel joint 24.

Thus, as the platform 10 is lowered from a barge to its working site, pipeline extension member 26 as well as the swivel joint protection carriage 27, are fixed to one side of the platform by a series of clamps. Further, the upper end of member 26 extends above the water's surface.

To make the necessary connection between the reeled pipeline or other pipe lengths, and extension member 26, lay barge 21 is brought to a position adjacent to platform 10. Thus, the actual connecting operation is accomplished at the water's surface. This is achieved by gradually pivoting pipe extension 26 and carriage 27 with the lay barge's 21 tensioning equipment and anchor system to a convenient angle from the platform. Protection carriage 27 serves to protect swivel joint 24 from stresses due to the required tension and any flexure of the pipeline during movement. In such a position, the extension upper end is at a convenient height such that the initial welded or bolted joint can be made. Thereafter, as lay barge 21 is drawn away from platform 10, the pipeline extension 26 is further pivoted and lowered, and pipeline 19 is unreeled or pipe lengths added from lay barge 21. After sufficient pipe has been added, pipeline 19 will assume a general "S" formation as it proceeds to the ocean floor. At this point conventional pipe laying methods may resume thereby minimizing as much as possible bending stresses that will be imposed on the pipe.

It is appreciated that the pipeline laying operation from lay barge 21 will follow th normal procedure including the use of pipe straightening and welding equipment, as well as stingers to support the pipeline intermediate the barge and ocean floor.

Subsequent to the pipe laying operation being completed, or at least the pipeline coming to rest on the ocean floor, and sufficient settling time expired, the pivotal joint formed by flexible member 24 between the riser member 18 and pipeline extension 26, is solidified. This will obviate the possibility of further movement thereof and will permanentize the sealing mechanism of the joint.

Solidification of this joint is achieved through the use of a suitable material, such as grout, cement, or other medium which will function to harden about the joint exterior, or in the inner members thereof. In either instance the process will preclude further relative movement therebetween. The grouting medium therefore serves the dual purpose of solidifying the swivel joint, as well as assuring the fluid tight integrity of the joint to avoid the loss of the product as the latter is pumped to or from riser 18.

The joint solidifying medium which can take the form of any several known hardenable substances is preferably forced into or about the joint by a conduit 36 extending above the water's surface. After the fluidized material becomes hardened, conduit 36 can be left in place, or removed completely from the platform.

Other modifications and variations of the invention as hereinbefore set forth can be made without departing from the spirit and scope thereof, and therefore, only such limitations should be imposed as are indicated in the appended claims.

We claim:

1. In a marine structure adapted to be anchored to the floor of a body of water and having a product carrying riser depending therefrom through which a fluid is passed to or from a pipeline at said floor to the water's surface, a substantially upstanding leg structure of sufficient length to extend from the ocean floor and having bracing means attached thereto, said product carrying riser member depending from said leg structure, and having one end terminating at the lower end of the latter, a pipe extension member having an elongated conduit extending from said platform lower end, to a point beyond the water's surface when said extension member is disposed in an upright disposition, means forming a product carrying flexible joint communicating said riser lower end, with said pipe extension element a first member fixed to said platform, and a second member rotatably engaging said first member, said second member being pivotally movable about a horizontal axis which extends through said first member, whereby to permit controlled pivotal movement of said extension member from its upright position, to a resting position adjacent the ocean floor, and joint protection means operably depending from said platform supportably engaging said pipe extension member, being pivotal about said horizontal axis.

2. In the apparatus as defined in claim 1, wherein said joint protection means pivotally attached to the platform is operable in a substantially vertical plane as said pipe extension member is lowered to the ocean floor.

3. In an apparatus as defined in claim 1, wherein said joint protected member includes spaced apart pivot pins depending from said structure and disposed in substantial alignment with said first member axis, and a pair of arms operably engaging said respective pivot points and mutually supportably engaging said pipe extension member.

* * * * *